US005689546A

United States Patent [19]

Sheets et al.

[11] Patent Number: 5,689,546

[45] Date of Patent: Nov. 18, 1997

[54] PERFORMANCE MONITORING SYSTEM FOR T1 TELEPHONE LINES

[75] Inventors: Laurence L. Sheets, St. Charles; Michael T. Fitzgerald, Bolingbrook, both of Ill.

[73] Assignee: Teltrend Inc., St. Charles, Ill.

[21] Appl. No.: 463,627

[22] Filed: Jun. 6, 1995

[51] Int. Cl.$^6$ .............................. H04M 1/24; H04M 3/08; H04M 3/22

[52] U.S. Cl. .............................. 379/34; 379/2; 379/10; 379/22; 379/27; 370/242

[58] Field of Search .............................. 379/26, 27, 28, 379/29, 30, 34, 35, 7, 9, 10, 11, 12, 15, 14, 23, 22; 375/224–228, 238–239; 370/241, 242, 243, 248, 252

[56] References Cited

U.S. PATENT DOCUMENTS

| | | | |
|---|---|---|---|
| 5,042,027 | 8/1991 | Takase et al. | 370/252 |
| 5,173,893 | 12/1992 | Dariano | 379/21 |
| 5,189,663 | 2/1993 | Williams | 370/421 |
| 5,448,388 | 9/1995 | Ohde et al. | 359/115 |

OTHER PUBLICATIONS

SmartLink™, 3175 Automatic Protection Switch System—Dated Aug., 1994—By Westell, Inc.

*Primary Examiner*—Curtis Kuntz
*Assistant Examiner*—Binh K. Tieu
*Attorney, Agent, or Firm*—McDonnell Boehnen Hulbert & Berghoff

[57] ABSTRACT

A system for monitoring the performance of T1 digital transmission lines by incorporating a common unit interconnected to a plurality of network interface units as well as to a spare transmission line leading to a central office. The common unit is configured to interrogate any or all of the network interface units in order to obtain status information such transmission error rates, and to report such status information via the spare transmission line to the central office. By dedicating a common unit to oversee error detection and/or status reporting, communication between the central office and customer premises equipment need no longer be disrupted while transmission performance is being monitored.

25 Claims, 3 Drawing Sheets

PERFORMANCE MONITORING SYSTEM FOR T1 TELEPHONE LINES

BACKGROUND OF THE INVENTION

The present invention relates generally to telecommunication transmission facilities and, more particularly, to a performance monitoring system that may, for example, periodically report on the error rate experienced by a plurality of T1 transmission lines.

Many telecommunication transmission systems include a central office that may transmit useful data, or "payload," signals over transmission lines to equipment on customer premises. Typically, digital payload signals are sent over the transmission lines through a series of regenerative repeaters, to a digital network interface unit, and in turn via an analog subscriber loop to customer premises equipment.

As described in U.S. patent application Ser. No. 08/145,771, filed on Oct. 29, 1993 by Bergstrom et al. ("Bergstrom"), which is incorporated herein by reference, the digital network interface is the demarcation between the telephone operating company's side of the telephone line and the customer's side of the telephone line. Electrically, the digital network interface is generally transparent to payload signals but can be used for special maintenance functions such as loopback. The digital network interface, in combination with a channel bank, receives payload signals from the transmission lines and converts the signals from digital to analog. The channel bank then transmits the resulting analog signals for each of a series of channels differentially on two wire conductors known as tip-ring pairs.

The Bell telephone system in the United States, for instance, has widely utilized a digital time-domain multiplexing pulse code modulation system known as the T1 transmission system. Each T1 transmission system carries 24 8-KB/second voice or data channels on two pairs of exchange grade cables. One pair of cables provides communication in each direction. T1 transmission systems are used in multiples "N", thus providing N×24 channels on N×2 cable pairs.

For convenience and simplification of terminology, the pair of cables carrying signals from the central office to the customer premises equipment may be referred to as a "transmit" line, and the pair of cables transmitting data from the customer premises equipment to the central office may be referred to as a "receive" line. These designations are made only as a matter of convenience; when an observer (such as a testing technician) changes position from a central office to the customer premises, what used to be a "transmit" line can be come a "receive" line, and what used to be a "receive" line can become a "transmit" line.

In the T1 system, the data to be transmitted over the lines, such as speech, is sampled at a rate of 8,000 hertz, and the amplitude of each sample is measured. The amplitude of each sample is compared to a scale of discrete values and assigned a numeric value. Each discrete value is then encoded into binary form.. Representative binary pulses appear on the transmission lines. The binary form of each sample pulse consists of a combination of seven pulses, or bits. An eighth bit is periodically added to allow for signaling.

As described in U.S. patent application Ser. No. 08/193,946, filed on Feb. 9, 1994 by Sheets et al. ("Sheets"), and U.S. patent application Ser. No. 07/943,859, filed on Sep. 11, 1992 by Pesetski et al. ("Pesetski"), each of which are incorporated herein by reference, a coding system is typically used to convert the analog signal to a digital signal. The system guarantees some desired properties of the signal, regardless of the pattern to be transmitted. The most prevalent code in the United States is bipolar coding with an all zero limitation (also called Alternative Mark Inversion or "AMI"). With bipolar coding, alternating one's (high bits) are transmitted as alternating positive and negative pulses, assuring a direct current balance and avoiding base line wander. Further, an average density of one pulse in eight slots, with a maximum of fifteen zeros between "ones," is required. This is readily obtained in voice-band coding, however, by simply not utilizing an all zero word. Contrasted with bipolar coding is unipolar coding, in which every occurrence of a high bit is seen as a positive pulse.

In many telecommunication systems, data may be transmitted sequentially in discrete groups of bits called "frames." In the T1 system, for instance, each of the 24 channels in the T1 system is sampled within a 125 microsecond period (equivalent to 1/8,000) of a second, constituting one frame. A synchronizing bit, or "frame bit," is added to each frame to serve as a flag, enabling line elements to distinguish each frame from the preceding frame or from noise on the line. Since there are 8 bits per channel and there are 24 channels and one frame bit at the end of each frame, the total number of "bits" needed per frame is 193. Thus, the resulting line bit rate for T1 systems is 1.544 million bits per second.

As further explained by Sheets and Pesetski, signals that violate either the coding rules or the framing rules established in a particular system are detected as errors. Thus, for example, under a bipolar coding scheme, two positive pulses should never occur in sequence. To the extent such pulses do occur adjacent to each other, such a signal may be noted as a bipolar coding violation. Similarly, a digital signal that violates framing rules (such as framing bit requirements) established in a given system is detected as a "frame error." In a given encoding protocol, a sufficient number of frame errors may be detected as a frame loss.

In a typical telecommunications transmission system, the central office occasionally wishes to investigate the performance characteristics of a particular transmission line. In such a case, for example, the central office may send a signal to the digital network interface, instructing the network interface to fall into "logical loopback mode" or simply "loopback." In loopback, all signals sent down the transmit line to the network interface are shunted back and sent down the receive line. While in loopback, if the same test signal that is sent down the transmit line for a substantial period of time is received by the central office along the receive line, then the central office can be substantially assured that the conductors in the T1 line are functioning properly. Alternatively, if the same signal applied to the transmit line does not return along the receive line, then the central office can determine that an error or malfunction has occurred at a point along that T1 line.

Unfortunately, placing a digital network interface in loopback mode can be disruptive for the consumer, because, during loopback, the customer premises equipment is essentially cut off from the central office and is precluded from communicating via the T1 line. This problem can be avoided by installing a spare T1 line and shunting the customer premises equipment to the spare T1 line during loopback. However, such a spare T1 line cannot itself be interrogated by the central office unless a second or even third T1 line is also in place. Further, the installation of additional T1 lines is expensive and therefore not desirable.

Another method of investigating errors in T1 transmission lines is to provide the network interface unit with a substantial electronic memory. The network interface unit may then monitor the data that passes from the central office to the customer premises equipment and detect certain bit patterns as errors or events such as bipolar violations or loss of frame. The network interface may then store in its memory an indication of the type of error or event that was detected. Thereafter, upon receiving an authorization signal from the central office, the network interface unit can be placed in loopback, and the network interface unit can download the contents of its memory on the receive line for transmission to the central office.

Unfortunately, this modified method of investigating T1 errors also suffers from the above-discussed problem of cutting off the customer premises equipment from communication with the central office. Furthermore, this method also requires the addition of substantial memory to each digital network interface, thus greatly increasing the expense of manufacturing the network interface units.

SUMMARY OF THE INVENTION

In a principal aspect, the present invention is system for monitoring performance of T1 lines in a digital transmission line network. The present invention incorporates a common control unit interconnected to a spare T1 transmission line as well as to each of the payload transmission lines in proximity to the digital network interface units. Preferably in cooperation with one or more memory circuits and one or more detector circuits, the common unit is configured to serially receive status information or error data from the transmission lines or network interface units and to selectively transmit the information or data to the central office via the spare transmission line.

By dedicating a common unit to oversee error detection and/or error reporting, the present invention eliminates the need to cut off communication with the customer premises equipment when testing transmission line performance. Further, the present invention thereby greatly reduces or eliminates the need to build substantial memory circuits in each network interface unit or to add additional spare transmission lines.

Accordingly, a principal object of the present invention is an improved system for monitoring T1 transmission line performance. Another object of the present invention is a common unit interconnected to a plurality of transmission lines or to a plurality of network interface units, configured to oversee the detection of errors in payload data and/or the reporting of such errors to the central office.

Still another object of the present invention is to eliminate the need to cut off communication between the central office and the customer premises equipment when monitoring transmission line performance between the central office and the customer premises equipment. Yet another object of the present invention is a cost efficient method of monitoring T1 transmission lines for errors such as bipolar violations or frame loss. These and other objects, features, and advantages of the present invention are discussed or apparent in the following detailed description.

BRIEF DESCRIPTION OF THE DRAWINGS

Preferred embodiments of the present invention are described herein with reference to the drawings, wherein.

DETAILED DESCRIPTION OF THE PREFERRED EMBODIMENTS

Figure 1:
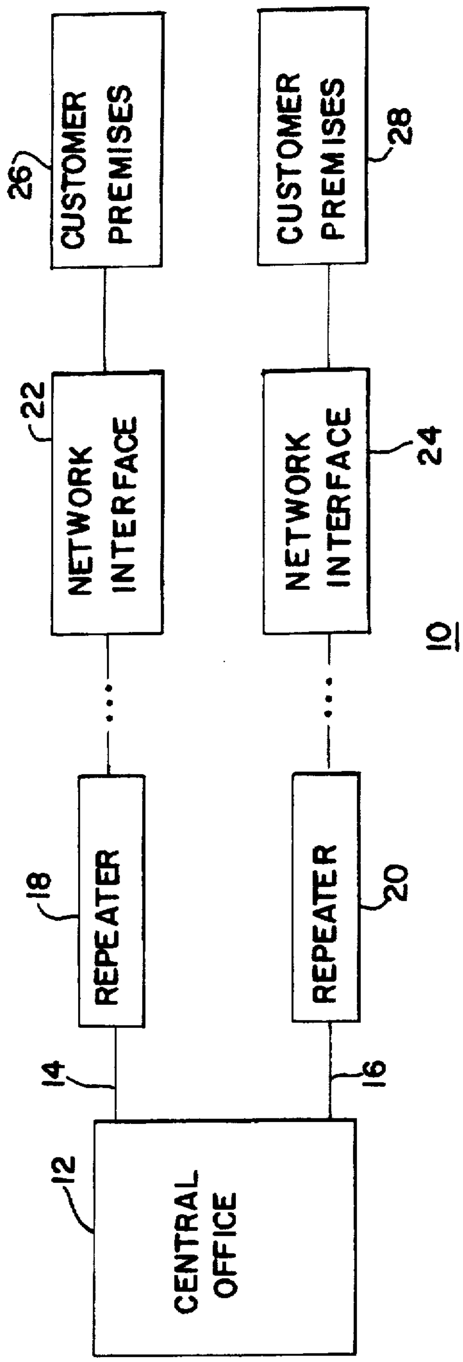
FIG. 1 is a block diagram of a prior art T1 telecommunication system.

Referring first to FIG. 1, there is shown a block diagram depicting a prior art digital transmission line network 10. The transmission line network 10 includes a central office 12 interconnected via a plurality of transmission line spans 14, 16 and regenerative repeaters 18, 20 to a series of network interface units or digital network interfaces 22, 24. Each network interface unit includes circuitry that may be referred to as a network interface circuit. The transmission lines 14, 16 are typically T1 type lines. However, depending on the network, the transmission lines may alternatively be any of a variety of other types of lines including but not limited to copper or fiber optic based cables. Each network interface unit 22, 24 is in turn respectively connected to customer premises equipment 26, 28. While FIG. 1 illustrates only two network branches originating from the central office 12 and extending respectively to two network interface units and two respective sets of customer premises equipment, those skilled in the art will appreciate that, in practice, many additional branches may stem from the central office, each to other sets of customer premises equipment.

In a typical T1 transmission system, multiple network interface units are placed together in the same physical location. In this regard, the network interface units are typically grouped together and mounted in a maintenance shelf, such as the Teltrend Rack-Mount Digital Shelf Assemblies Models DSA-120/A and DSA/111/A. Commonly, multiple sets of customer premises equipment are dispersed among separate buildings or facilities. In such a configuration, a remotely positioned maintenance shelf usually holds network interface units interconnected respectively to the various customer premises equipment. On the other hand, in larger or more complex buildings or facilities that use more than 24 phone lines, multiple sets of customer premises equipment may actually be located within the building itself. In such case, the maintenance shelf containing the respective network interface units may also be located within the building.

Figure 2:
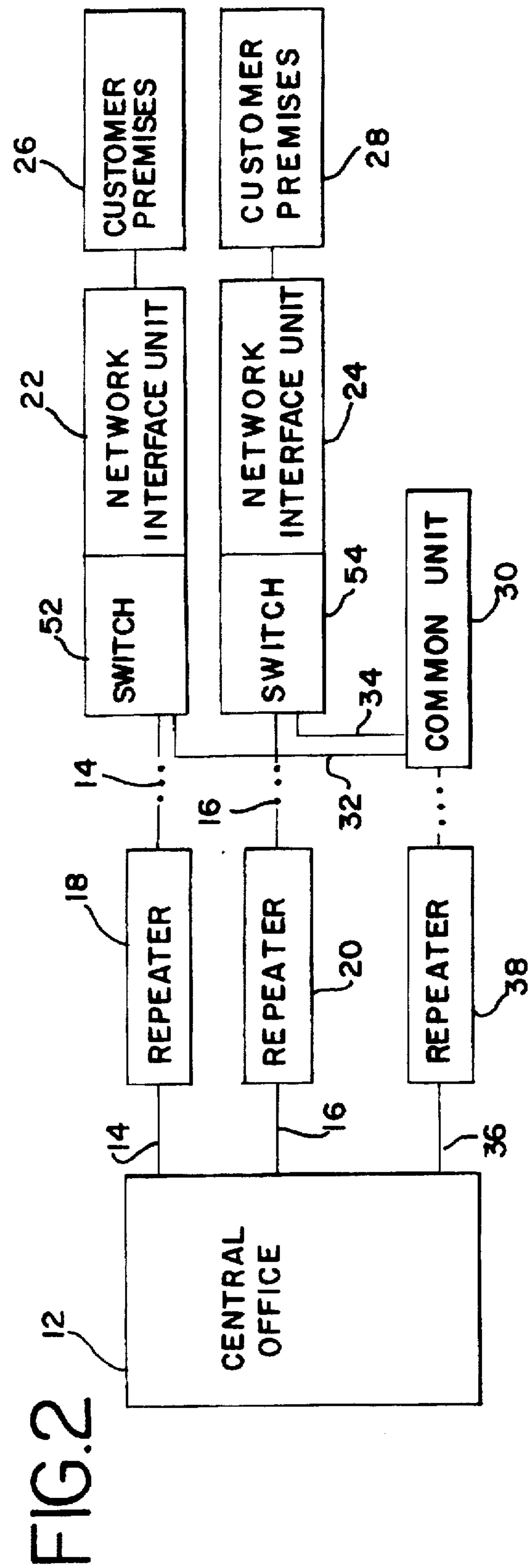
FIG. 2 is a block diagram of a preferred embodiment of the present invention.
Figure 3:
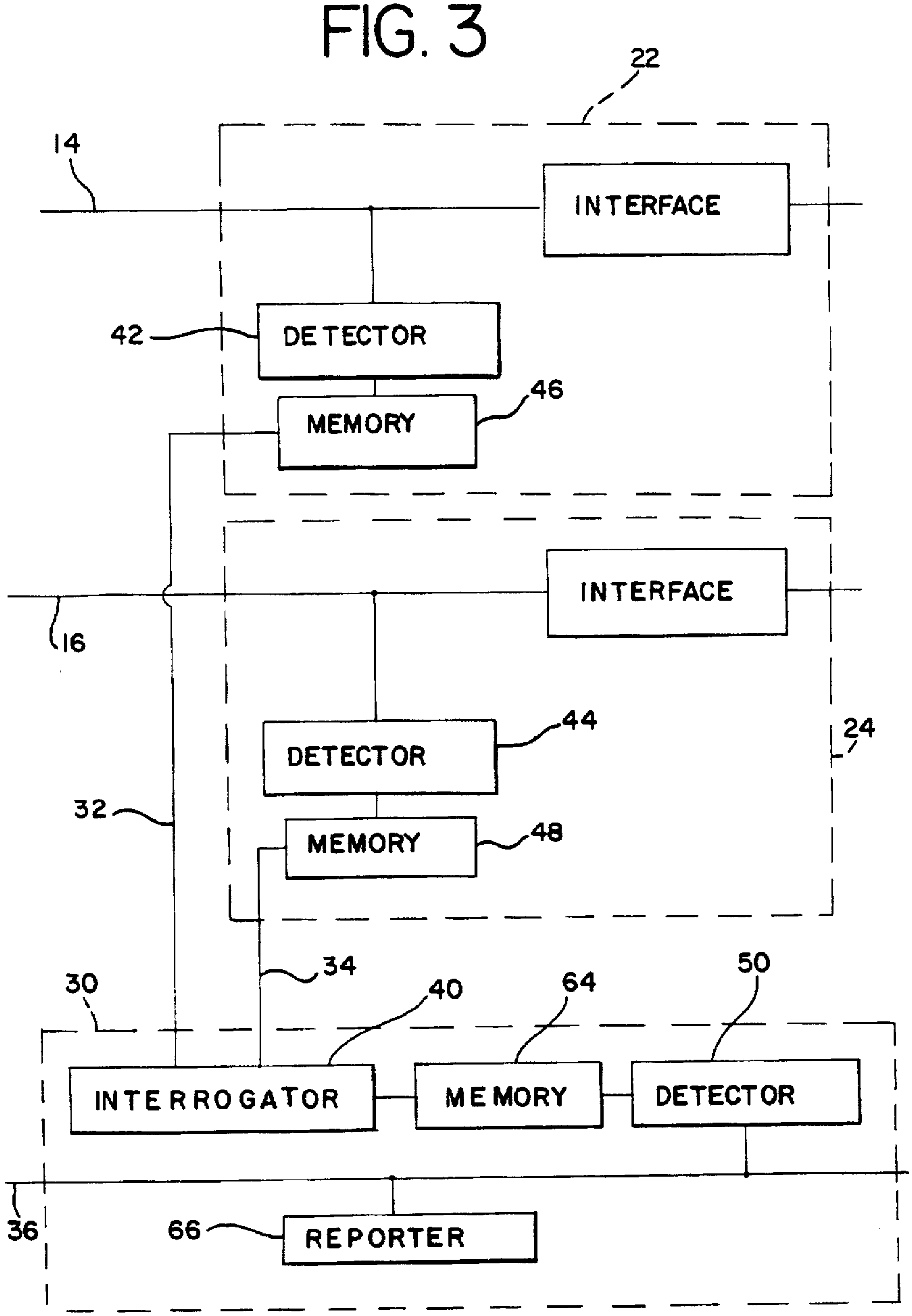
FIG. 3 is a detailed block diagram of the preferred embodiment of the present invention.
Figure 4:
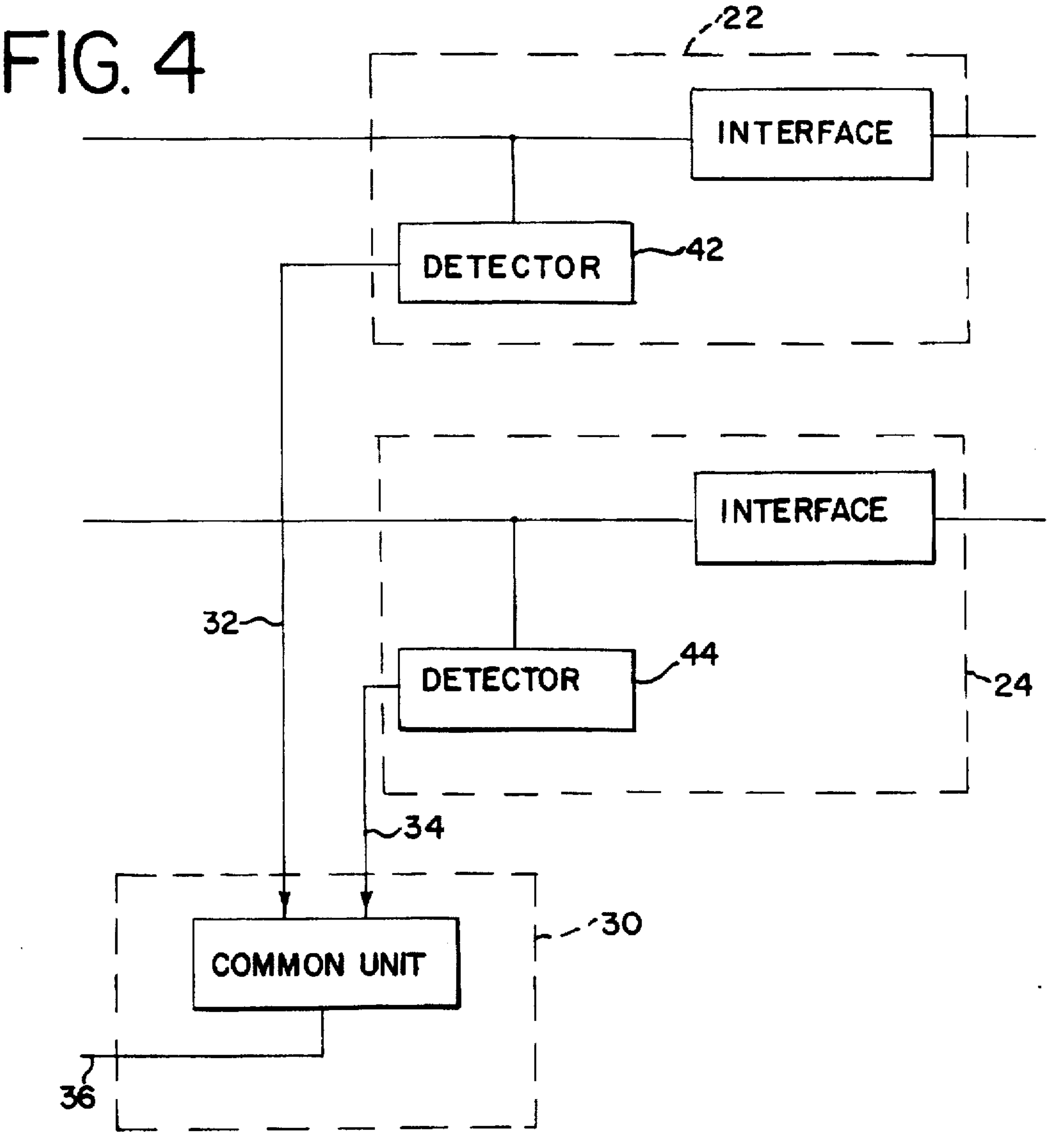
FIG. 4 is a block diagram of an alternative embodiment of the present invention.

Referring now to FIGS. 2–4, preferred embodiments of the present invention are shown as a performance monitoring system for T1 transmission lines or for other types of transmission lines. In these embodiments, a "common unit" or common control unit 30 is interconnected to the plurality network interface units (e.g., 22, 24) via lines 32, 34. Lines 32, 34 may be T1 transmission lines or other types of transmission lines known to those skilled in the art. The common unit 30 may be interconnected in parallel to the group of network interface units and is also interconnected via a spare transmission line or status transmission line 36 and a series of regenerative repeaters (e.g., 38) to the central office 12. In the preferred embodiment, the common unit 30 is stored proximately to the network interface units 22, 24 to which it is interconnected, and in this regard it may be desirable to store the common unit in the same maintenance shelf unit that holds the plurality of network interface units.

Generally speaking, the common unit 30 includes circuitry sometimes referred to as a "common circuit," which is configured to receive error status information from any or all of the network interface units and to transmit an error report signal along the spare transmission line 36 to the central office 12. In this way, a technician or computer system at the central office 12 can analyze the performance of the transmission line (e.g., 14) leading to a given network interface unit (e.g., 22) without necessitating a break in communication between the central office 12 and the respective customer premises equipment (e.g., 26). As discussed below, the status information processed by the common unit 30 may include, for example, a list of errors such as bipolar violations or frame loss that are detected in the payload signal transmitted in either direction along the given transmission line. Alternatively, the status information may simply comprise a copy of at least a portion of the payload signal received by the network interface unit from the respective transmission line. In any event, the common unit 30 may selectively or automatically store, further analyze and/or transmit to the central office 12 a report signal indicative of transmission line performance.

As illustrated by FIG. 3, the common unit 30 preferably contains interrogating circuitry 40 that is configured to interrogate any one or more of the network interface units (e.g., 22, 24) and to receive status information from the network interface units. In one embodiment of the present invention, the common unit 30 is configured to serially and repetitively interrogate each of the network interface units, for example, by polling or multiplexing through each network interface unit and serially receiving information from each of the units. The common unit can thus download information from each network interface unit, for example, every few seconds, thereby eliminating the need for substantial, expensive memory circuits in each of the individual network interface units. Alternatively, the common unit 30 may be configured to interrogate any one or more of the network interface units 22, 24 either selectively on command or pursuant to a preprogrammed schedule. Still alternatively, the common unit may be configured to continuously interrogate any one or more of the network interface units on a substantially real time basis.

Errors or other aspects of the signal transmitted through a network interface unit along a given transmission line are detected in the preferred embodiment by a detector circuit 42, 44 that can be built into or coupled to each network interface unit and/or the common unit. A detector circuit or error detector (e.g., 42) built into the network interface unit (e.g., 22) can continuously, periodically or selectively examine the signal transmitted along the transmission line (e.g., 14) in either direction through the network interface unit (e.g., 22) in order to detect status information such as a number or rate of bipolar or framing errors. Small amounts of such status information can be temporarily stored in a small, inexpensive memory circuit 46, 48 interconnected to the detector circuit 42, 44 in the network interface unit 22, 24, for subsequent interrogation by and transfer to the common unit 30.

Still alternatively, a detector circuit or error detector 50 can be incorporated into the common unit itself in order to examine signals passed to the common unit from any of the network interface units, and to extract errors or other status information from those signals. In an alternative embodiment in conjunction with this configuration, as shown in FIG. 2, a switching circuit 52, 54 can be coupled to each network interface unit 22, 24 in order to enable the payload signal passing through the network interface unit to be shunted to the common unit for analysis. In this embodiment, for instance, a switching signal may be transmitted from the central office along a given T1 line (e.g., 14) to a respective network interface unit (e.g., 22). The switching signal is then detected by either the switching circuit (e.g., 52) or a detector circuit (e.g., 42) within the network interface unit. In response, the switching circuit associated with the given T1 line then shunts traffic from that line into the common unit and out of the common unit before the signal passes fully through the network interface unit. In this way, the common unit 30 may then directly monitor the traffic passing between the central office 12 and the customer premises equipment (e.g., 26) and, as will be discussed below, store in its memory an indication of any errors noted. Alternatively or in addition, the common unit 30 may then provide transmission status information on a real time basis to the central office 12 via the spare T1 line 36.

Figure 5:
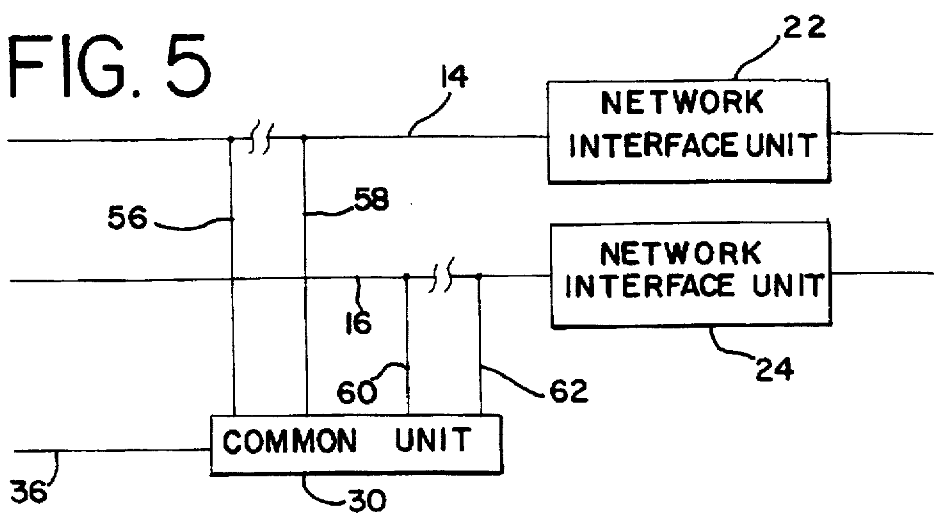
FIG. 5 is a block diagram of another alternative embodiment of the present invention.

In a closely related embodiment, as illustrated by FIG. 5, a similar shunting effect can be accomplished by interconnecting the common unit directly to the transmission lines (e.g., 14, 16), via shunt lines 56, 58, 60, 62. In this embodiment, the location of the central office may be referred to as a first line position, and the location of the common unit may be referred to as a second line position. The second line position may, but need not necessarily, be proximate to the plurality of network interface units. In the configuration of this embodiment, a payload signal transmitted in either or both directions along any or all of the transmission lines (e.g., 14, 16) can be selectively or continuously shunted to pass through the common unit on its way to or from the central office. Thus, for example, a payload signal traveling along transmission line 14 toward customer premises equipment 26 can be diverted along line 56 to the common unit 30, through the common unit 30, and back along line 58 to the transmission line 14 for continued transmission to the customer premises equipment 26. In this embodiment, the common unit can be selectively commanded or preprogrammed to poll any or all of the transmission lines for error data or other status information. Alternatively, the common unit can be configured to continuously examine the payload signal traveling down any one or more of the transmission lines, and to report occurrences of transmission errors to the central office on a substantially real time basis.

In the preferred embodiment, the common unit also includes a memory circuit 64 designed to store information such as status signals received from network interface units. In this embodiment, as the common unit 30 receives information from the network interface units regarding errors in the transmitted data, the common unit may store the error data in its memory 64. Periodically, the common unit may then transmit to the central office 12 a report signal indicating the transmission status of the various lines. In part for this purpose, the common unit 30 may include a reporting circuit 66 (shown in FIG. 3) configured to generate and transmit a report signal along the spare line 36. As indicated above, the report signal may represent status information comprising an analysis or list of transmission errors such as bipolar violations or frame loss, or the report signal may simply comprise a periodic sample of the signal transmitted to the network interface unit (e.g., 22) on the given transmission line (e.g., 14). In either case, the common unit 30 is configured to examine, store and/or transmit the report signal to the central office 12, based for example on information received directly from the network interface units 22, 24 or on information stored in the memory circuit 64 of the common unit. In this regard, as the reporting of transmission status from the common unit 30 to the central office 12 becomes more frequent, the amount of required memory in the common unit decreases. Ultimately, in the event the common unit is configured to report transmission status information to the central office on a substantially real time basis, the amount of required memory in the common unit is substantially reduced or entirely eliminated.

Still further, in the preferred embodiment, the common unit 30 is configured to send a report signal to the central office 12 only upon detection of a status request signal. In this embodiment, for instance, the central office 12 can send a status request signal along a given transmission line (e.g., 14) or along the status transmission line 36. In the event the status request signal is sent along the transmission line (e.g., 14) leading to a network interface unit (e.g., 22), a detector circuit (e.g., 42) in the network interface unit (e.g., 22) is configured to detect the status request signal and to responsively forward to the common unit 30 a status signal representative of pertinent status information. The common unit in turn stores or analyzes the status signal or transmits a report signal embodying the status information to the central office 12. Alternatively, in the event the common unit 30 receives a status request signal along the status transmission line 36, a detector circuit and/or signaling circuit (not shown) within the common unit 30 identifies the status request signal. The common unit responsively interrogates any designated network interface unit and downloads a status signal from the network interface unit. In turn, by means of a reporting circuit (not shown) included in the common circuit 30, the common unit transmits a report signal via the status line 36 to the central office 12.

In any embodiment of the present invention, the common unit 30 may also serve as a "second half" of a loopback circuit, so that a loopback test can be performed on any transmit line without sending a return signal to the central office 12 on the receive line. In this embodiment, the central office 12 can monitor a payload signal being sent along a transmit line, and the common unit 30 can be instructed to enter loopback mode with respect to the given transmit line. A substantial copy of the signal carried by the transmit line is then transmitted to the common unit and in turn transmitted by the common unit via the spare line 36 back to the central office 12. In this way, the central office can compare the transmitted and received signals to ensure transmission quality up to the point of the network interface unit, without disrupting communication between the customer premises equipment and the central office.

Preferred embodiments of the present invention have been described above. Those skilled in the art will understand, however, that changes and modifications may be made in these embodiments without departing from the true scope and spirit of the present invention, which is defined by the following claims.

We claim:

1. A monitoring system for a digital transmission line network, said digital transmission line network including a plurality of transmission lines and a plurality of network interface units, each of said transmission lines being interconnected respectively to one of said network interface units, said monitoring system comprising, in combination:

a spare transmission line;

a common unit interconnected to said plurality of network interface units;

an interrogating circuit within said common unit, for interrogating said network interface units and for receiving status signals representative of status information from said network interface units;

a memory circuit within said common unit, for storing said status signals; and a reporting circuit within said common unit, for transmitting along said spare transmission line a report signal representative of said status information.

2. A monitoring system as claimed in claim 1, wherein each of said network interface units includes an error detector for detecting errors in payload transmitted along the transmission line interconnected to said network interface unit, and wherein said status information comprises a number of errors.

3. A monitoring system as claimed in claim 1, wherein said status information comprises payload transmitted along said transmission lines.

4. A monitoring system as claimed in claim 3, wherein said common unit further includes an error detector for detecting errors in said payload.

5. A monitoring system as claimed in claim 1, wherein said interrogating circuit includes means to serially and repetitively interrogate each network interface unit.

6. A monitoring system as claimed in claim 1, wherein said spare transmission line is also interconnected to a central office.

7. A monitoring system for a digital transmission line network, said digital transmission line network including a plurality of transmission lines and a plurality of network interface circuits, each of said transmission lines being interconnected respectively to one of said network interface circuits, said monitoring system comprising, in combination:

a spare transmission line;

a plurality of detector circuits, each interconnected respectively to at least one of said transmission lines for detecting transmission line performance and for responsively generating at least one status signal representing said transmission line performance;

an interrogator circuit interconnected in parallel to said detector circuits for receiving status signals from said detector circuits;

a reporting circuit interconnected to said interrogator circuit for transmitting along said spare transmission line a report signal indicative of said transmission line performance.

8. A monitoring system as claimed in claim 7, wherein said status signals comprise payload transmitted along said transmission lines.

9. A monitoring system as claimed in claim 7, further including a memory circuit interconnected to said interrogator circuit for storing said status signals.

10. A monitoring system as claimed in claim 7, further including a plurality of memory circuits, each interconnected respectively to at least one of said detector circuits for storing said status signals generated respectively by each said detector circuit.

11. A monitoring system as claimed in claim 7, wherein said spare transmission line is also interconnected to a central office.

12. A monitoring system for a digital transmission line network, said digital transmission line network including a plurality of transmission lines and a plurality of network interface circuits, each of said transmission lines being interconnected respectively to one of said network interface circuits, said monitoring system comprising, in combination:

a status transmission line;

a plurality of detector circuits, each interconnected respectively to at least one of said network interface circuits for detecting errors in payload transmitted along said transmission lines and for responsively producing status signals indicative of said errors; and a common circuit interconnected to said detector circuits for serially receiving said status signals from said detector circuits and transmitting said status signals along said status transmission line.

13. A monitoring system as claimed in claim 12, further including a plurality of memory circuits, each respectively interconnected to at least one of said detector circuits.

14. A monitoring system as claimed in claim 12, wherein said common circuit comprises:

a memory circuit for storing said status signals;

a signaling circuit for receiving a status request signal along said status transmission line; and a reporting circuit for transmitting said status signals along said status transmission line in response to said status request signal.

15. A monitoring system as claimed in claim 12, wherein said status transmission line is also interconnected to a central office.

16. A monitoring system for a digital transmission line network, said digital transmission line network including a plurality of transmission lines and a plurality of network interface units, each of said transmission lines being interconnected respectively to one of said network interface units, said transmission lines carrying payload defining a status, said monitoring system comprising, in combination:

a spare line;

a common unit interconnected to said spare line and to said plurality of transmission lines, said common unit receiving payload from said transmission lines and in turn transmitting said payload along said spare line; and a reporting circuit within said common unit, for transmitting along said spare line a report signal representative of said status.

17. A monitoring system as claimed in claim 16, wherein said spare line is also interconnected to a central office.

18. A monitoring system as claimed in claim 17, wherein said common unit is located in proximity to said plurality of network interface units.

19. An error reporting system for a digital transmission line network including a plurality of transmission lines carrying digital payload signals between a first line position and a second line position, said error reporting system comprising, in combination:

a spare transmission line interconnecting said first line position to said second line position;

a common unit;

at least one shunt line proximate to said second line position, said at least one shunt line interconnecting said common unit to said plurality of transmission lines, said payload signals carried by said transmission lines being diverted via said at least one shunt line through said common unit;

an error detector within said common unit for detecting errors in said payload signals; and a reporting circuit within said common unit for transmitting to said first line position a status signal representative of said errors.

20. A monitoring system for a digital transmission line network, said digital transmission line network including a plurality of transmission lines and a plurality of network interface units, each of said transmission lines being interconnected respectively to one of said network interface units and each of said transmission lines carrying payload, each of said network interface units having a detector for detecting a status of the payload transmitted along the transmission line interconnected to said network interface unit, and each of said network interface units having a memory for temporarily storing status information representative of said status, said monitoring system comprising, in combination:

a spare transmission line;

a common unit interconnected to said plurality of said network interface units and to said spare transmission line;

an interrogating circuit within said common unit for interrogating said network interface units and receiving said status information from said memories of said network interface units; and a reporting circuit within said common unit for transmitting along said spare transmission line a report signal representative of said status information.

21. A monitoring system as claimed in claim 20, wherein said common unit includes a common memory for storing said status information received from said network interface units.

22. A monitoring system as claimed in claim 21, wherein said memory in each of said network interface units is substantially smaller than said common memory.

23. A monitoring system as claimed in claim 20, wherein said interrogating circuit serially and repetitively interrogates each of said network interface units to obtain status information from each of said memories.

24. A monitoring system as claimed in claim 20, wherein said status information comprises a number of errors in said payload.

25. A monitoring system as claimed in claim 20, wherein said spare transmission line is also interconnected to a central office.

* * * * *